United States Patent
Rajan Kesavelu Shekar et al.

(10) Patent No.: US 12,427,939 B2
(45) Date of Patent: Sep. 30, 2025

(54) MOBILE HEARABLE DEVICE

(71) Applicant: NXP B.V., Eindhoven (NL)

(72) Inventors: Pramod Rajan Kesavelu Shekar, Bangalore (IN); Rinze Ida Mechtildis Peter Meijer, Herkenbosch (NL)

(73) Assignee: NXP B.V., Eindhoven (NL)

( * ) Notice: Subject to any disclaimer, the term of this patent is extended or adjusted under 35 U.S.C. 154(b) by 1064 days.

(21) Appl. No.: 16/929,022

(22) Filed: Jul. 14, 2020

(65) Prior Publication Data

US 2021/0016732 A1    Jan. 21, 2021

(30) Foreign Application Priority Data

Jul. 19, 2019   (EP) ..................... 19187261

(51) Int. Cl.
  *B25J 9/16*   (2006.01)
  *B60H 1/00*   (2006.01)
  (Continued)

(52) U.S. Cl.
  CPC ..... *B60R 16/0373* (2013.01); *B60H 1/00757* (2013.01); *B60R 11/0247* (2013.01);
  (Continued)

(58) Field of Classification Search
  CPC ............ B60R 16/0373; B60R 11/0247; B60H 1/00757; G10L 15/08; G10L 15/22;
  (Continued)

(56) References Cited

U.S. PATENT DOCUMENTS 6,198,998 B1   3/2001   Farmer et al.
6,322,453 B1   11/2001  Ishiguro et al.
(Continued)

FOREIGN PATENT DOCUMENTS

DE   102013207094 A1   10/2013
EP      2942876 A1     11/2015
KR    20020047366 A    6/2002

OTHER PUBLICATIONS

Beckwith, Jimi; "Volvo has developed software in collaboration with Microsoft, which allows drivers to control certain functions remotely, through the Microsoft Band 2 smartwatch"; Autocar; retrieved from the internet on Jul. 16, 2020.

Geiger, Jennifer; "Hey, Mercedes! Voice-Activated Assistant Drives New MBUX System"; retrieved from the Internet Jul. 16, 2020 https://www.cars.com/articles/hey-mercedes-voice-activated-assistant-drives-new-mbux-system-1420698621047; 6 pages (Jan. 18, 2018).

(Continued)

*Primary Examiner* — Adam R Mott
*Assistant Examiner* — Ricardo I Viscarra

(57) ABSTRACT

A mobile hearable device for communicating with a vehicle control system is described. The mobile hearable device includes a microphone, and a wireless transceiver configured as one of a near field magnetic induction (NFMI) transceiver and a near field electromagnetic induction (NFEMI) transceiver. The mobile hearable device includes a processor coupled to the transceiver and the microphone. The processor receives a location identifier via the transceiver from a location identification transmitter located in a vehicle, the location identification transmitter is configured as one of a NFMI transmitter and a NFEMI transmitter. If the processor receives a speech signal from a user of the mobile hearable device, it determines whether the speech signal includes an actuator control command and generates a control instruction comprising the actuator control command and the location identifier. The control instruction is transmitted to a vehicle control system and used to control an actuator in a vehicle dependent on the location of the person using the mobile hearable device.

20 Claims, 5 Drawing Sheets

(51) Int. Cl.
| | |
|---|---|
| B60R 11/02 | (2006.01) |
| B60R 16/037 | (2006.01) |
| E05F 15/70 | (2015.01) |
| G10L 15/08 | (2006.01) |
| G10L 15/22 | (2006.01) |
| H04B 1/38 | (2015.01) |
| H04B 5/24 | (2024.01) |
| H04B 5/72 | (2024.01) |
| H04R 1/40 | (2006.01) |
| H04R 3/00 | (2006.01) |
| H05B 47/12 | (2020.01) |

(52) U.S. Cl.
CPC .............. *G10L 15/08* (2013.01); *G10L 15/22* (2013.01); *H04B 1/38* (2013.01); *H04B 5/24* (2024.01); *H04B 5/72* (2024.01); *H04R 1/406* (2013.01); *H04R 3/005* (2013.01); *E05F 15/70* (2015.01); *E05Y 2400/10* (2013.01); *E05Y 2400/8505* (2024.05); *E05Y 2400/851* (2024.05); *E05Y 2900/55* (2013.01); *G10L 2015/088* (2013.01); *G10L 2015/223* (2013.01); *H04R 2420/07* (2013.01); *H04R 2499/13* (2013.01); *H05B 47/12* (2020.01)

(58) Field of Classification Search
CPC ........ G10L 2015/088; G10L 2015/223; H04B 1/38; H04B 5/0031; H04B 5/0075; H04R 1/406; H04R 3/005; H04R 2420/07; H04R 2499/13; E05F 15/70; E05Y 2400/10; E05Y 2400/85; E05Y 2900/55; H05B 47/12
See application file for complete search history.

(56) References Cited

U.S. PATENT DOCUMENTS

| | | |
|---|---|---|
| 6,324,453 B1 | 11/2001 | Breed et al. |
| 9,122,775 B2 | 9/2015 | Schunder et al. |
| 9,197,986 B1 | 11/2015 | Kerselaers et al. |
| 9,377,860 B1 | 6/2016 | Weber et al. |
| 2008/0297341 A1 | 12/2008 | McClanahan |
| 2012/0148077 A1* | 6/2012 | Aldaz ................. H04R 25/558 381/315 |
| 2014/0142783 A1 | 5/2014 | Grimm et al. |
| 2014/0229175 A1 | 8/2014 | Fischer et al. |
| 2016/0104486 A1 | 4/2016 | Penilla et al. |
| 2016/0159200 A1 | 6/2016 | Kim |
| 2016/0191120 A1* | 6/2016 | Dobyns .................... H04B 5/72 455/41.1 |
| 2016/0335038 A1* | 11/2016 | Choi ...................... B60K 35/00 |
| 2017/0305371 A1* | 10/2017 | Buttolo ................. H04W 8/005 |
| 2017/0308689 A1* | 10/2017 | Boesen ................... G06F 1/163 |
| 2018/0277123 A1* | 9/2018 | Boesen ................. H04R 1/1041 |
| 2019/0179416 A1* | 6/2019 | Yako ........................ G06F 3/167 |
| 2019/0303095 A1* | 10/2019 | Sohoni .................. B60K 35/65 |
| 2021/0166683 A1* | 6/2021 | Joh ......................... G10L 15/22 |

OTHER PUBLICATIONS

Hauber, Jörg; EE News Automotive; "Intelligent Car Audio Distribution"; 9 pages (Jan. 28, 2016).

Iot for all; "7 Automotive Connectivity Trends Fueling the Future"; 7 pages (Feb. 21, 2018).

Patently Apple; "Like a Science Fiction Novel, Apple reveals how your Personal Driving Profile will Control your Autonomous Car"; retrieved from the internet on Jul. 16, 2020, http://www.patentlyapple.com/patently-apple/2018/07/like-a-science-fiction-novel-apple-reveals-how-your-personal-driving-profile-will-control-your-autonomous-car.html; 11 pages.

ReSound: "ReSound Micro Mic—hearing aid microphone"; retrieved from the Internet https://www.resound.com/en-us/hearing-aids/accessories/micro-mic; 6 pages (Jul. 16, 2020).

Downeast Toyota; "How To Use the Toyota Sienna Driver Easy Speak Feature"; Posted in Toyota Sienna, Toyota Technology; 2 pages (Oct. 27, 2017).

FAQs—Frequently Asked Questions for All things Toyota; "What is Driver Easy Speak?"; retreived from the Internet http://toyota.custhelp.com/app/answers/detail/a_id/7946/~/what-is-driver-easy-speak%3F ; 1 page (Jul. 20, 2020).

Needle, David; "Nuance in-Car Speech Recognition Lets Passengers Control Infotainment"; eWeek; retreived from the Internet Jul. 20, 2020, https://www.eweek.com/mobile/nuance-in-car-speech-recognition-lets-passengers-control-infotainment; 3 pages (Feb. 1, 2017).

\* cited by examiner

MOBILE HEARABLE DEVICE

CROSS-REFERENCE TO RELATED APPLICATIONS

This application claims the priority under 35 U.S.C. § 119 of European patent application no. 19187261.3, filed Jul. 19, 2019 the contents of which are incorporated by reference herein.

FIELD

This disclosure relates to a mobile hearable device for communicating with a vehicle control system.

BACKGROUND

Voice recognition is used to allow car drivers to communicate with a virtual personal assistant to control in-car infotainment systems. This may allow a driver to perform operations without taking their hands off the wheel. Voice interaction may also eliminate the traditional buttons as input to vehicle infotainment systems or controller units.

SUMMARY

Various aspects of the disclosure are defined in the accompanying claims. In a first aspect there is provided a mobile hearable device for communicating with a vehicle control system, the mobile hearable device comprising: a microphone; a wireless transceiver configured as one of a near field magnetic induction (NFMI) transceiver and a near field electromagnetic induction (NFEMI) transceiver; a processor coupled to the transceiver and the microphone and configured to: receive a location identifier via the transceiver from a location identification transmitter located in a vehicle, the location identification transmitter being configured as one of a NFMI transmitter and a NFEMI transmitter; receive a speech signal from a user of the mobile hearable device; determine whether the speech signal comprises an actuator control command; generate a control instruction comprising the actuator control command and the location identifier; wherein the mobile hearable device is configured to transmit a control instruction to a vehicle control system wirelessly coupled to the mobile hearable device, the vehicle control system being configured to control an actuator in the vehicle dependent on the location of a person using the mobile hearable device within the vehicle.

In one or more embodiments, the mobile hearable device may comprise a further microphone. The processor may be operable to receive the speech signal from the microphone and further microphone and to apply beam-forming to the received speech signal.

In one or more embodiments, the processor may be further configured to identify one or more keywords from the received speech signal.

In one or more embodiments, the processor may be further configured to: in response to identifying one or more keywords, determine whether the one or more identified keywords correspond to an actuator control command.

In one or more embodiments, in response to identifying a valid actuator control command the processor may be further configured to transmit a control instruction comprising the valid actuator control command and the location identifier.

In one or more embodiments, the mobile hearable device may comprise a biomarker interface coupled to the processor, wherein the mobile hearable device is further configured to receive biomarker data and to transmit a further instruction comprising biomarker data and the location identifier.

In one or more embodiments, the mobile hearable device may be further configured to transmit the control instruction to a location identification transceiver coupled to the vehicle control system via the transceiver.

In one or more embodiments, the mobile hearable device may comprise a further transceiver coupled to the processor and be further configured to transmit the control instruction to a vehicle control transceiver via the further transceiver.

In one or more embodiments, the processor may be further configured to receive a list of allowable keywords from the vehicle control transceiver.

In a second aspect there is provided a vehicle control system comprising: at least one location identification transmitter located in a vehicle and configured as a NFMI or NFEMI transmitter; a vehicle function controller configured to be coupled to one or more vehicle actuators and comprising a vehicle control transceiver; wherein each of the at least one location identification transmitters are configured to transmit a respective location identifier to a mobile hearable device, the vehicle control transceiver is configured to receive a control instruction comprising the control command and one location identifier from the mobile hearable device, and the vehicle function controller is configured to control the one or more vehicle actuators dependent on the control command and the location identifier.

In one or more embodiments, the vehicle control system may further comprise a black box recorder, wherein the actuator controller is further configured to receive a further instruction comprising biomarker data and a location identifier and to store the biomarker data and the location identifier in a black box recorder.

In one or more embodiments, the vehicle control system may be coupled to one or more vehicle actuators configured to control one or more of heating ventilation and air conditioning, a window, a light, and an infotainment system.

In a third aspect there is provided a method of controlling a vehicle actuator using a mobile hearable device comprising a transceiver configured as one of a NFMI transceiver and a NFEMI transceiver, the method comprising: receiving via the transceiver a location identifier transmitted by the location identification transmitter; receiving a speech signal from a user of the mobile hearable device; determining whether the speech signal comprises an actuator control command; generating a control instruction comprising the actuator control command and the location identifier; and wirelessly transmitting the control instruction to a vehicle control system wirelessly coupled to the mobile hearable device to control an actuator dependent on the location of a user of the mobile hearable device within the vehicle.

In one or more embodiments, the method may further comprise applying beam forming to the speech signal.

In one or more embodiments, the method may further comprise identifying one or more keywords from the received speech signal; and in response to identifying one or more keywords, determining whether the one or more identified keywords correspond to a valid actuator control command; and transmitting a control instruction comprising the valid actuator control command.

In a fourth aspect there is described a computer program product comprising instructions which, when being executed by a processing unit within a mobile hearable device comprising a transceiver configured as one of a NFMI transceiver and a NFEMI transceiver, cause said processing unit to perform the steps of receiving via the transceiver a location identifier transmitted by a location identification transmitter; receiving a speech signal; determining whether the speech signal comprises an actuator control command; generating a control instruction comprising the actuator control command and the location identifier; and wirelessly transmitting the control instruction to a vehicle control system wirelessly coupled to the mobile hearable device to control an actuator dependent on the location of a user of the mobile hearable device within the vehicle.

BRIEF DESCRIPTION OF THE DRAWINGS

In the figures and description like reference numerals refer to like features. Embodiments of are now described in detail, by way of example only, illustrated by the accompanying drawings in which.

DETAILED DESCRIPTION OF EMBODIMENTS

Figure 1:
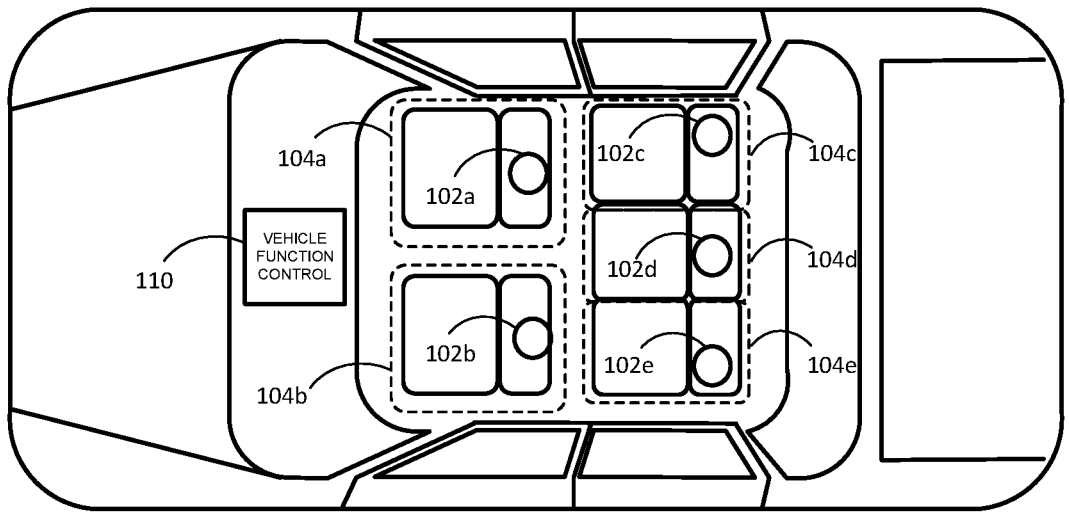
FIG. 1 Shows a car including a vehicle control system according to an embodiment.

FIG. 1 shows a car 100 including a vehicle control system according to an embodiment. The vehicle control system includes a vehicle function controller 110 and a number of location identification transmitters 102a to 102e. The location identification transmitters 102a to 102e each include a transmitter which may be a near field magnetic induction (NFMI) transmitter or a near field electromagnetic induction transmitter (NFEMI). NFMI refers to any communication means that makes use of transmissions within a localized magnetic field. NFEMI is an extension of NFMI which also uses an electric antenna for transmissions as explained for example in U.S. Pat. No. 9,197,986B1 and European Patent application 15164621.3. Each of the location identification transmitters 102a to 102e may be positioned in a respective seating position in the car 100 and preconfigured with an appropriate location identifier corresponding to a seating position within the car 100.

These location identification transmitters 102a-e may be used to identify a corresponding personal area zone 104a-e. Vehicle function controller 110 may include an actuator controller (not shown) typically used to control various actuators in a vehicle such as heating, ventilation and air-conditioning (HVAC), lighting systems, window control, seat position as well as in car audio systems and other infotainment systems typically found within a car. The vehicle function controller 110 may include a wireless transceiver (not shown), such as a Bluetooth or other interface which may be used to communicate with other devices.

In some examples, the vehicle function controller 110 may communicate with each of the location identification transmitters 102a-e if those transmitters also have a compatible wireless interface such as a Bluetooth interface. In some examples, the vehicle function controller 110 may have a wired network connection (not shown) to the location identification transmitters 102e-a. However, in some examples communication between the vehicle function controller 110 and the location identification transmitters 102a-e is not required. In some examples the location identification transmitters may also have NFMI and NFEMI receivers.

The vehicle function controller 110 and the location identifiers 102a-e may be implemented as hardware or a combination of hardware and software running on microprocessors or digital signal processors.

Figure 2:
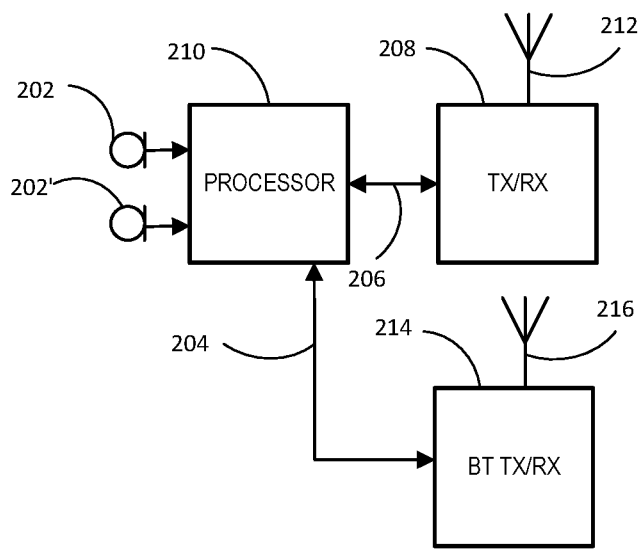
FIG. 2 Illustrates mobile hearable device according to an embodiment.

FIG. 2 illustrates a mobile hearable device 200. A first microphone 202 may be connected to a processor 210. A second microphone 202' may be connected to the processor 210. The processor 210 may have a first bidirectional connection 206 to a first transceiver 208 which may be a NFMI transceiver or a NFEMI transceiver. The first transceiver 208 may be connected to an antenna 212 which may be a NFMI antenna or NFEMI antenna. The processor 210 may have a second bidirectional connection 204 to a second wireless transceiver 214 such as a Bluetooth transceiver. The second wireless transceiver 214 may be connected to a second antenna 216. The mobile hearable device 200 may be implemented in hardware or a combination of hardware and software. For example, the processor 210 may be implemented by instructions executed by a digital signal processor or other microprocessor such as for example the NXP i.MX RT processor or processors with similar functionality. In some examples the second wireless transceiver 214 may be omitted. The processor 210 may implement speech detection of keywords for example using a machine learning model or other keyword detection method known to the skilled person. The processor 210 may implement beam forming from a combination of signals received via the first microphone 202 and the second microphone 202' using signal processing techniques known to the skilled person. In other examples, beamforming may not be used in which case the second microphone 202' may be omitted.

Figure 3:
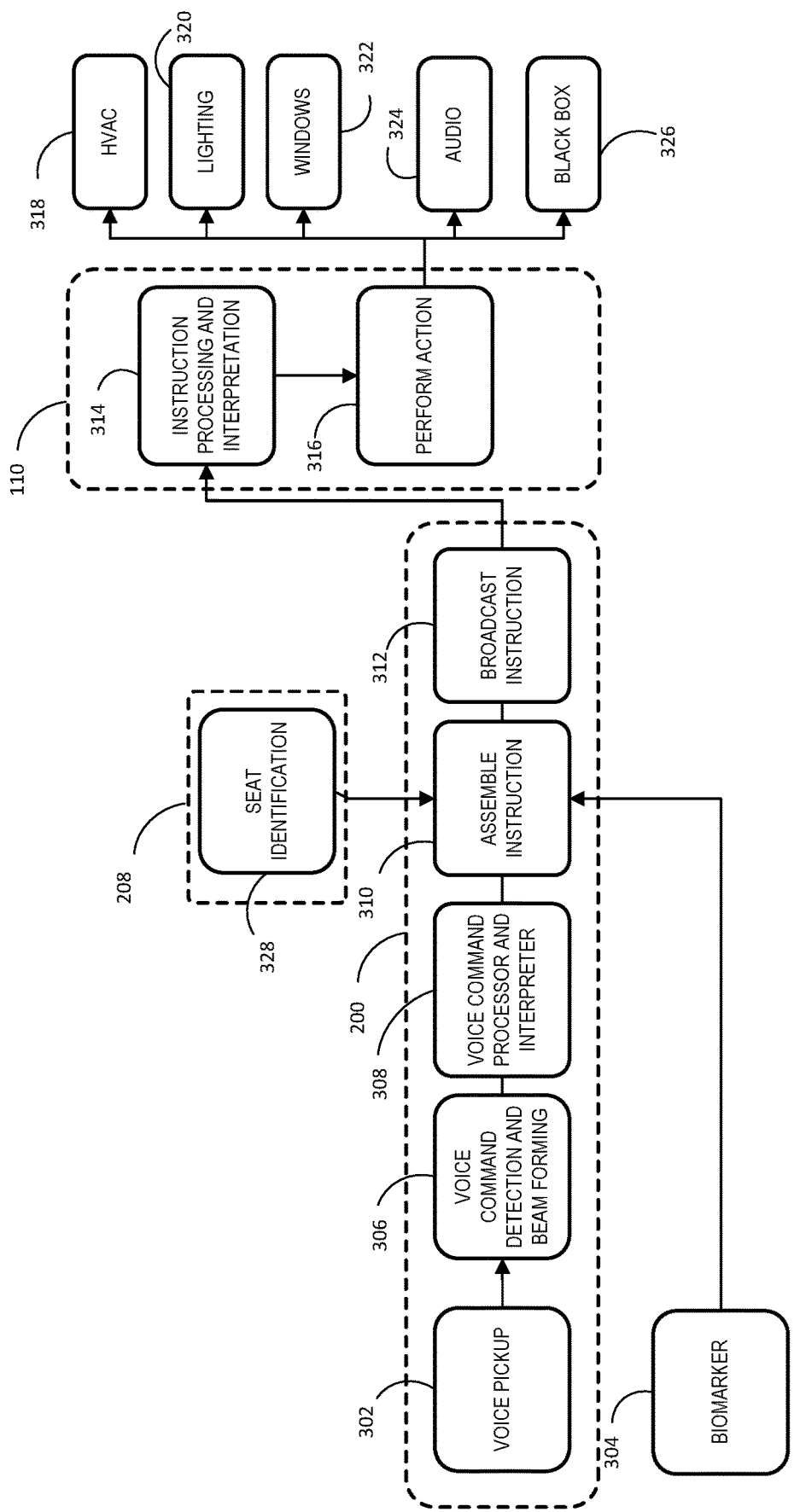
FIG. 3 illustrates a functional block diagram of the method of operation of a system including the vehicle control system of FIG. 1 and the mobile hearable device of FIG. 2.

FIG. 3 illustrates 300 an example method of operation for controlling a vehicle actuator using the mobile hearable device 200, and a vehicle control system including the location identification transmitters 102a-e and the vehicle function controller 110. When a user is positioned in the vehicle, the mobile hearable device 200 determines the closest of the location identification transmitter 102a-e using the hearable device first transceiver 208. The mobile hearable device 200 selects the seat location identifier 328 from the closest location identification transmitter 102a-e. The seat location identifier 328 may be as simple as a numerical indication of the seat used or have further information such as seat orientation or biomarker information.

The inventors of the present disclosure have appreciated that by using NFMI communication which may have a range less than 1 m or NFEMI communication which is used for communication across the human body, the mobile hearable device 200 can reliably detect the closest of the location identification transceivers 102a-e and so accurately identify the position of the user in the car within one of the personal zones 104a-e. The mobile hearable device 200 may detect a signal from multiple location identifier transmitters 102a-e. The signal from the closest location identifier transmitter will be significantly stronger than any others because of the short range of the NFMI or NFEMI transmitter and so, if multiple signals are detected, a received signal strength indication (RSSI) measurement may be used to reliably determine the closest location identification transmitter 102*a-e*. In some examples using NFMI transmitters, each of the location identification transceivers 102*a-e* may be located in an upper part of the respective seat for example the headrest or top part of the seat. in some example the transceiver may be located in the roof above the given seat. For examples using NFEMI transmitters, the location may be any point inside the given seat.

In operation, when the user speaks, the voice may be detected in step 302 via the microphone 202 and second microphone 202' and the hearable device 200 may perform voice command detection and beam-forming in step 306. The beam-forming may be determined by the location of the microphones 202, 202' in the hearable device. In some examples, more than two microphones may be used. The beam forming may improve discrimination between speech from the user of the hearable device 200 and other occupants of the car 100. In step 308 the processor 210 may process and interpret the voice command. The supported commands per vehicle per location within the vehicle may be pre-defined in the mobile hearable device 200 prior to use. In other examples the supported commands may be downloaded from the vehicle control system during initialisation. In step 310 an instruction may be assembled by the processor 210 including the voice command and the seat identification. The voice command may be for example a command to increase or decrease temperature, turn on or turn off lights, open or close a window, or modify an audio setting such as volume, bass, treble. Optionally, biomarker data generated from additional hearable sensors in step 304 may transmitted to the hearable device using a human body area network (not shown). This biomarker data may include but is not limited to for example heartbeat, body temperature, or indicators whether the occupant is active or asleep.

After the instruction is assembled in step 310, the instruction may be broadcast in step 312 to the vehicle function controller 110. In some examples, the assembled instruction may be output on processor output 204 and broadcast via wireless connection for example using Bluetooth connected directly to the vehicle function controller 110. In this case the mobile device 200 may be wirelessly coupled to the vehicle function controller 110 via the second transceiver 214.

In other examples the location identification transmitters 102*a-e* may include a NFMI or NFEMI receiver and are coupled to the vehicle function controller 210 either via a wireless connection or an in-vehicle wired network such as for example but not limited to a Control Area Network (CAN), Local interconnect network (LIN) or Ethernet network. In these examples, the mobile hearable device 200 may broadcast the assembled instruction to the paired location identification transceiver via the bidirectional connection 206 to the first transceiver 208. The location identification transceiver may then transmit the instruction to the vehicle function controller 110. In this case, the second wireless transceiver 214 may be omitted as the mobile device 200 may be wirelessly coupled to the vehicle function controller 110 via the first transceiver 208.

The vehicle function controller 110 may receive and process the instruction in step 314 and then in step 316 perform an action dependent on the received instruction. The vehicle function controller 110 may control one or more actuators to control a HVAC system 318, lighting 320, windows 322, audio 324. Optionally the seat identification and biometric data and voice commands may be stored in a black box recorder 326.

Figure 4:
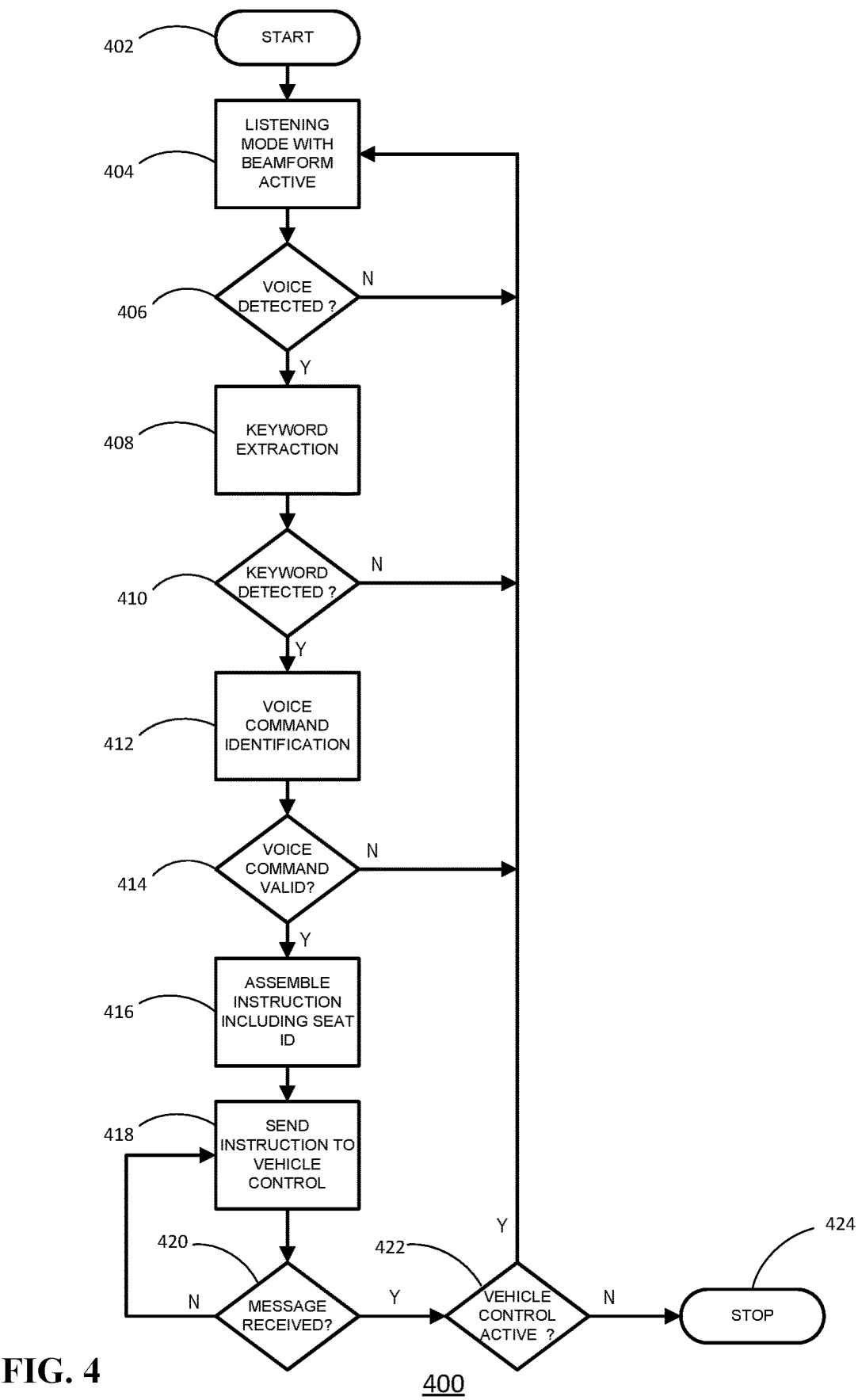
FIG. 4 shows a method of operation of a mobile hearable device according to an embodiment.

FIG. 4 shows a method of operation 400 of a mobile hearable device, such as the mobile hearable device 200 illustrated in FIG. 2. In step 402 the process starts. At step 404 the mobile hearable device may be in a listening mode, optionally with the beamforming algorithm active. In step 406, the method may determine whether a voice has been detected. If a voice has not been detected, the method returns to step 404. If a voice has been detected, the method 400 proceeds to step 408 where a keyword may be extracted using techniques familiar to the skilled person. In step 410, a check is made to determine if a keyword has been detected. If a keyword has not been detected, then the method returns to step 404. If a keyword has been detected, then the method proceeds to step 412 which includes a voice command identification process whereby the keyword is compared with a list of predetermined voice commands.

In step 414 a check may be made to determine whether the voice command is valid. This check may include for example a comparison of the identified voice commands compared with the allowable voice commands for a particular seat location from a preconfigured list provided to the hearable mobile device. In some examples, this preconfigured list may be provided to the hearable mobile device by the location identification transmitter. In other examples, the preconfigured list may be provided by vehicle control system via a different wireless connection, for example Bluetooth, as part of the pairing process or after the pairing process has complete.

In step 416, the method 400 may assemble an instruction including the seat identification together with the valid voice command. In step 418 the assembled instruction may be sent to the vehicle control system. In step 420, the method may check to see if an acknowledge message has been received from the vehicle control system. If an acknowledge message has not been received, the method may return to step 418 and retransmit the instruction. If the instruction has been received in step 420 the method proceeds to optional step 422 and checks whether or not the vehicle control system is still active. If the vehicle control system is inactive, then the method 400 terminates at optional step 424. Returning to step 422, if the vehicle control system is still active, then the method returns to step 404 and the cycle repeats. In other examples steps 422 and 424 may be omitted and the method may proceed directly from step 420 back to step 404

Figure 5:
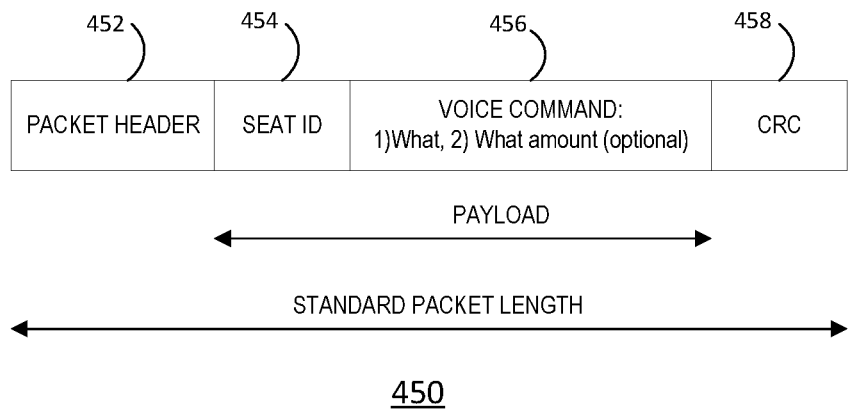
FIG. 5 shows an example command instruction used in one or more embodiments.

FIG. 5 shows the format of an example instruction packet 450 for communication between a hearable device 200 and the vehicle function controller 110. This instruction packet 450 may be assembled for example as part of the instruction assembly step 416 in method 400. The instruction packet 450 may include a packet header 452, followed by a seat identification 454. The voice command 456 may consist of two parts. The first part may indicate which parameter to control, for example temperature, or lighting. The optional second part may include the desired parameter value, for example temperature set to 25 degrees Celsius. The first part of the parameter of the voice command 456 may include a unique identifier, for example temperature control is set as command-1, lighting control is set as command-2. The instruction packet may include a cyclic-redundancy-check (CRC) 458 provided as a check for a receiver to confirm the validity of the packet.

Figure 6:
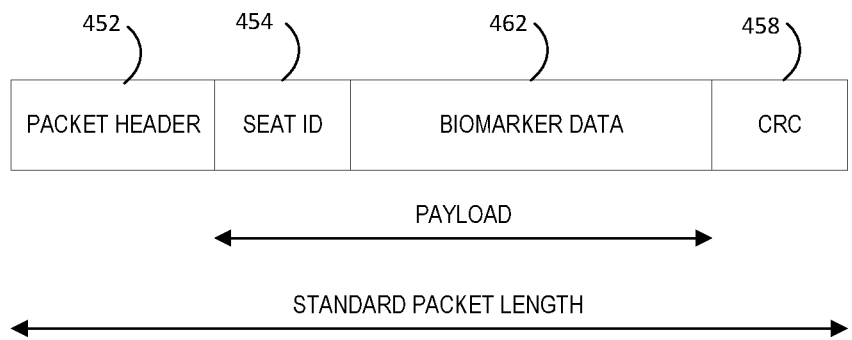
FIG. 6 illustrates an example command instruction used in one or more embodiments.

FIG. 6 shows an optional instruction packet 460 used for biomarker data. The instruction 460 is the same as instruction packet 450 with the voice command data 456 replaced with biomarker data 462. The optional biomarker instruction may be used by a vehicle control system connected to a mobile hearable device to for example store the data in the Black Box and/or alert the emergency services. In some examples, warnings may be provided to vehicle occupants in case of emergency, optionally signalling which occupant is concerned. For example, if the vehicle is a plane or train.

Figure 7:
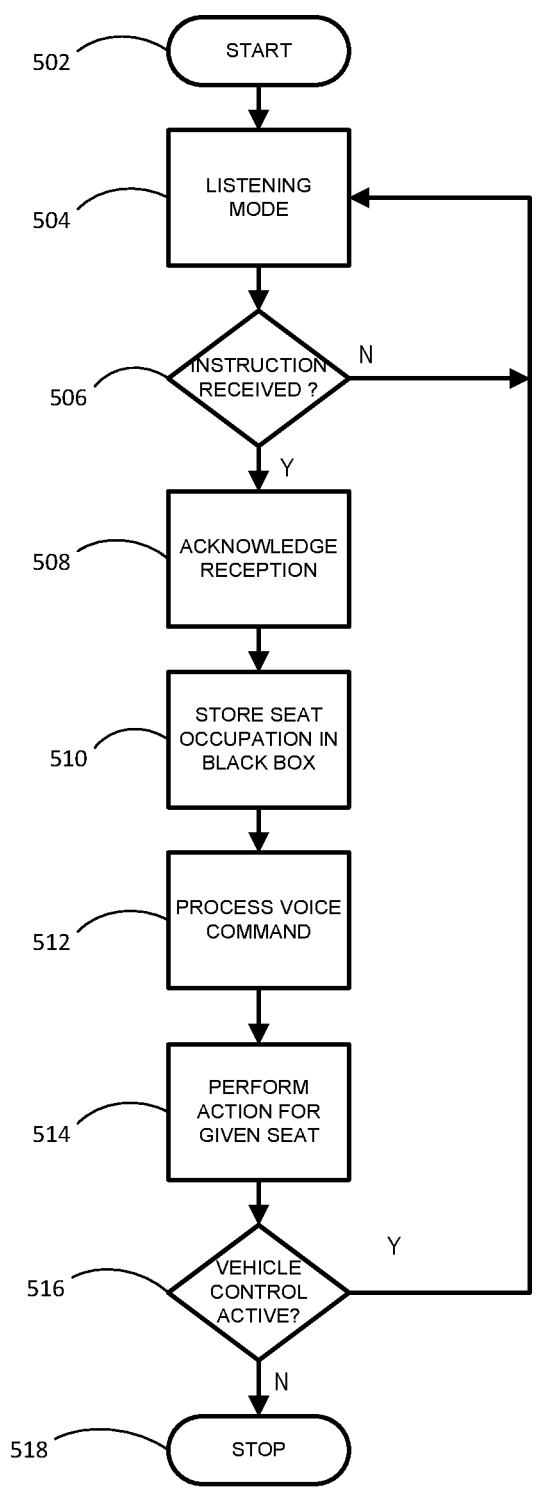
FIG. 7 illustrates a method of operation of a vehicle control system according to an embodiment.

FIG. 7 shows an example method of operation 500 of the vehicle control system according to an embodiment. The method starts at step 502, and then proceeds to step 504 which is a listening mode. In step 506, the method checks whether an instruction has been received. If an instruction has not been received, the method returns to step 504. If an instruction has been received, then the method may check the CRC to determine whether any corruption of the received data has occurred. If the CRC is invalid, method may return to step 504. If the CRC is valid, at step 508, the method may generate an acknowledge signal to acknowledge receipt of the instruction in step 508. In optional step 510, the seat occupation identification may be stored in a black box.

In step 512, if the instruction includes a voice command, then the voice command is processed. This processing may include the interpreting of the "What" parameter of the Voice command 456 in the received packet 450. In this way the vehicle control system may recognize a unique identifier for understanding what parameter is to be controlled (e.g. temperature, lighting, etc.). Depending on the "what" parameter of the voice command, there may also be data on "what amount" to be controlled. This may also be interpreted by the process voice command step 512. In addition, the seat ID is processed such that the control action can be done specifically for that specific location.

In step 514, after the instruction has been interpreted, the requested control action will be performed. These control actions may be: Heating Ventilation and Air conditioning (HVAC) control, lighting control, window control, or any other possible control related to personal comfort zones. Optionally, the control action may control infotainment system functions. In some examples control functions may be restricted dependent on seat location. For example, control of the audio system may be restricted to the driver location.

In step 516, the method may check to determine whether the vehicle function control is still active. If the vehicle controller is active, the method may return to listening mode step 504. If the vehicle controller is not active, the method may terminate in step 518.

Embodiments described herein may provide a voice-based human-machine interface for vehicles that enable control functionality for personal zones inside vehicles. Any occupant of the vehicle may be enabled to interact with the vehicle by means of voice commands, for customizing environment interiors within their personal seating zone. The control actuators include, but are not limited to, HVAC control, to lighting control, window control, seat positioning. A direct correlation between an occupant of the vehicle providing the voice command, and the seating location of the occupant is provided. The figures illustrated show embodiments used in a car. However, it will be appreciated that other embodiments may be included in other vehicles such as planes, trains, buses.

Embodiments describe a mobile hearable device which may connect to a vehicle control system including a vehicle function controller and one or more location identification transmitters. Seats including a location identification transmitter may be used to determine a user location within a vehicle by the mobile hearable device. The mobile hearable device may implement beam forming techniques to improve the discrimination of any speech from a user with respect to other people in the vehicle and background noise. The collected voice commands at the mobile hearable device are provided to a vehicle control system wirelessly coupled to the mobile hearable device. The vehicle control system may implement the instructed control actions for the given personal seating zone. In some examples information may be provided to optional Black Boxes in a vehicle. The information may include for example, information on whether a given seat is occupied and biomarker information from a given seat occupant. This information may be retrieved for example in case of an accident or emergency.

The term hearable or mobile hearable device in this disclosure includes for example ear-mounted wearable computer interfaces, and hearing aids with embedded processors.

A mobile hearable device for communicating with a vehicle control system is described. The mobile hearable device includes a microphone, and a wireless transceiver configured as one of a near field magnetic induction (NFMI) transceiver and a near field electromagnetic induction (NFEMI) transceiver. The mobile hearable device includes a processor coupled to the transceiver and the microphone. The processor receives a location identifier via the transceiver from a location identification transmitter located in a vehicle, the location identification transmitter is configured as one of a NFMI transmitter and a NFEMI transmitter. If the processor receives a speech signal from a user of the mobile hearable device, it determines whether the speech signal includes an actuator control command and generates a control instruction comprising the actuator control command and the location identifier. The control instruction is transmitted to a vehicle control system and used to control an actuator in a vehicle dependent on the location of the person using the mobile hearable device.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A first mobile hearable device for wirelessly communicating with a vehicle control system in a vehicle, the first mobile hearable device comprising:
    a microphone;
    a wireless transceiver;
    a processor coupled to the transceiver and the microphone and configured to:
    detect a nearest location identification transmitter from a set of location identification transmitters in the vehicle;
    wherein each of the location identification transmitters define a corresponding personal area zone within the vehicle;
    receive a speech signal from a first user of the mobile hearable device;
    determine whether the speech signal includes a first actuator control command;
    generate a first control instruction based on the first actuator control command, the nearest identification transmitter, and a first corresponding personal area zone;
    transmit the first control instruction to the vehicle control system;
    wherein the vehicle control system is configured to compare the first actuator control command with a first set of allowable actuator control commands for the first corresponding personal area zone;
    wherein the vehicle control system is configured to control an actuator in the vehicle based on the first control instruction when the first actuator control command is within the first set of allowable actuator control commands for the first corresponding personal area zone;
    wherein the vehicle control system is configured to receive a second control instruction from a second user having a second corresponding personal area zone;
    wherein the second control instruction is within a second set of allowable actuator control commands for the second corresponding personal area zone;
    wherein the first corresponding personal area zone overlaps with the second corresponding personal area zone;
    wherein the vehicle control system is configured to limit an amount that the actuator in the vehicle may be controlled based on the first control instruction when the first actuator control command is within the first set of allowable actuator control commands for the first corresponding personal area zone; and
    wherein the vehicle control system is configured to control of the actuator based on the second control instruction as long as the second control instruction only requests control of the actuator within the limit set by the first control instruction.

2. The mobile hearable device of claim 1
    wherein the mobile hearable device comprises a further microphone and
    wherein the processor is operable to receive the speech signal from the microphone and further microphone and to apply beam-forming to the received speech signal.

3. The mobile hearable device of claim 1,
    wherein the processor is further configured to identify one or more keywords from the received speech signal.

4. The mobile hearable device of claim 3
    wherein the processor is further configured to: in response to identifying one or more keywords, determine whether the one or more identified keywords correspond to the actuator control command.

5. The mobile hearable device of claim 4
    wherein in response to identifying the actuator control command the processor is further configured to transmit the control instruction.

6. The mobile hearable device of claim 1 further comprising
    a biomarker interface coupled to the processor,
    wherein the mobile hearable device is further configured to receive biomarker data and to transmit a further control instruction including the biomarker data.

7. The mobile hearable device of claim 1:
    wherein the processor is further configured to receive a list of allowable keywords from the vehicle control system.

8. The mobile hearable device of claim 1:
    wherein each of the set of location identification transmitters are located near a user seating position in the vehicle;
    wherein the different personal area zone is a seat in the vehicle; and
    wherein the actuator is at the user seating position in the vehicle nearest to the nearest location identification transmitter.

9. The mobile hearable device of claim 1:
    wherein the actuator is configured to control at least one of: heating, ventilation, air conditioning, window, light, and infotainment vehicle settings affecting a location in the vehicle proximate to the nearest location identification transmitter.

10. The mobile hearable device of claim 1:
    wherein the vehicle control system is configured to control only those actuators located within the personal area zone corresponding to the nearest location identification transmitter and based on the control instruction.

11. The mobile hearable device of claim 1:
wherein the processor is further configured to receive the set of allowable actuator control commands for the corresponding personal area zone from the vehicle control system.

12. The mobile hearable device of claim 1:
wherein the vehicle control system is configured to receive the second control instruction from the second user having the second corresponding personal area zone;
wherein the first corresponding personal area zone overlaps with the second corresponding personal area zone; and
wherein the vehicle control system is configured to control the actuator in the vehicle based only on the first control instruction when the first actuator control command is within the first set of allowable actuator control commands for the first corresponding personal area zone, even if the second control instruction is within the second set of allowable actuator control commands for the second corresponding personal area zone and requests control of the actuator.

13. A vehicle control system comprising:
a set of location identification transmitters located in a vehicle;
wherein each of the location identification transmitters define a corresponding personal area zone within the vehicle;
a vehicle function controller configured to be coupled to one or more vehicle actuators;
wherein the set of location identification transmitters are each configured to transmit a respective location identifier to a mobile hearable device,
wherein the mobile hearable device is configured to detect a nearest one of the location identification transmitters;
wherein the mobile hearable device is configured to detect a first actuator control command from a first user in a first corresponding personal area zone;
wherein the mobile hearable device is configured to generate a first control instruction based on the first actuator control command, the location identifier of the nearest one of the identification transmitters, and the first corresponding personal area zone;
wherein the vehicle function controller is configured to wirelessly receive the first control instruction from the mobile hearable device,
wherein the vehicle function controller is configured to compare the first actuator control command with a first set of allowable actuator control commands for the first corresponding personal area zone; and
wherein the vehicle function controller is configured to control the one or more vehicle actuators dependent on the first control command when the first actuator control command is within the first set of allowable actuator control commands for the first corresponding personal area zone;
wherein the vehicle control system is configured to receive a second control instruction from a second user having a second corresponding personal area zone;
wherein the first corresponding personal area zone overlaps with the second corresponding personal area zone; and
wherein the vehicle control system is configured to control the actuator in the vehicle based only on the first control instruction when the first actuator control command is within the first set of allowable actuator control commands for the first corresponding personal area zone, even if the second control instruction is within a second set of allowable actuator control commands for the second corresponding personal area zone and requests control of the actuator.

14. The vehicle control system of claim 13 further comprising
a black box recorder,
wherein the vehicle function controller is further configured to receive a further instruction comprising biomarker data and the location identifier and to store the biomarker data and the location identifier in the black box recorder.

15. The vehicle control system of claim 13
wherein the one or more vehicle actuators are configured to control one or more of heating, ventilation, air conditioning, a window, a light, and an infotainment system affecting a location in the vehicle proximate to the nearest one of the location identification transmitters.

16. A method of controlling a vehicle actuator using a mobile hearable device comprising a transceiver configured as one of a NFMI transceiver and a NFEMI transceiver, the method comprising:
receiving via the transceiver a location identifier transmitted by a location identification transmitter nearest to the mobile hearable device;
wherein the location identification transmitter defines a first corresponding personal area zone within a vehicle;
receiving a speech signal from a first user of the mobile hearable device;
determining whether the speech signal comprises a first actuator control command;
generating a first control instruction comprising the first actuator control command, the location identifier, and the first corresponding personal area zone;
comparing the first actuator control command with a first set of allowable actuator control commands for the first corresponding personal area zone; and
wirelessly transmitting the first control instruction to a vehicle control system wirelessly coupled to the mobile hearable device to control an actuator affecting the location identification transmitter nearest to the mobile hearable device when the first actuator control command is within the first set of allowable actuator control commands for the first corresponding personal area zone;
wherein the vehicle control system is configured to receive a second control instruction from a second user having a second corresponding personal area zone;
wherein the second control instruction is within a second set of allowable actuator control commands for the second corresponding personal area zone;
wherein the first corresponding personal area zone overlaps with the second corresponding personal area zone;
wherein the vehicle control system is configured to limit an amount that the actuator in the vehicle may be controlled based on the first control instruction when the first actuator control command is within the first set of allowable actuator control commands for the first corresponding personal area zone; and
wherein the vehicle control system is configured to control of the actuator based on the second control instruction as long as the second control instruction only requests control of the actuator within the limit set by the first control instruction.

17. The method of claim 16 further comprising applying beam forming to the speech signal.

18. The method of claim 16 further comprising identifying one or more keywords from the received speech signal.

19. The method of claim 18 further comprising determining whether the one or more identified keywords correspond to a valid actuator control command; and
transmitting a control instruction comprising the valid actuator control command.

20. A non-transitory computer readable media storing thereon a computer program product comprising instructions which, when being executed by a processing unit within a mobile hearable device comprising a transceiver configured as one of a NFMI transceiver and a NFEMI transceiver, cause said processing unit to perform the steps of:

receiving via the transceiver a location identifier transmitted by a location identification transmitter nearest to the mobile hearable device;

wherein the location identification transmitter defines a first corresponding personal area zone within a vehicle;

receiving a speech signal;

determining whether the speech signal comprises a first actuator control command;

generating a first control instruction comprising the first actuator control command, the location identifier, and the first corresponding personal area zone; and comparing the first actuator control command with a first set of allowable actuator control commands for the first corresponding personal area zone; and wirelessly transmitting the first control instruction to a vehicle control system wirelessly coupled to the mobile hearable device to control an actuator affecting the location identification transmitter nearest to the mobile hearable device when the first actuator control command is within the first set of allowable actuator control commands for the first corresponding personal area zone;

wherein the vehicle control system is configured to receive a second control instruction from a second user having a second corresponding personal area zone;

wherein the first corresponding personal area zone overlaps with the second corresponding personal area zone; and wherein the vehicle control system is configured to control the actuator in the vehicle based only on the first control instruction when the first actuator control command is within the first set of allowable actuator control commands for the first corresponding personal area zone, even if the second control instruction is within a second set of allowable actuator control commands for the second corresponding personal area zone and requests control of the actuator.

\* \* \* \* \*